May 12, 1964

J. W. BELL, JR 3,132,751

TOBACCO HARVESTING APPARATUS

Filed Dec. 7, 1960

INVENTOR
JOHN W. BELL, JR.

BY  W. E. Sherwood

ATTORNEY

May 12, 1964

J. W. BELL, JR 3,132,751

TOBACCO HARVESTING APPARATUS

Filed Dec. 7, 1960

INVENTOR
JOHN W. BELL, JR.

BY W. E. Sherwood

ATTORNEY

May 12, 1964

J. W. BELL, JR 3,132,751

TOBACCO HARVESTING APPARATUS

Filed Dec. 7, 1960

INVENTOR
JOHN W. BELL, JR.

BY W. E. Sherwood

ATTORNEY

INVENTOR
JOHN W. BELL, JR.

BY W. E. Sherwood

ATTORNEY 3,132,751
TOBACCO HARVESTING APPARATUS
John W. Bell, Jr., 141 W. 19th St., Paris, Ky.
Filed Dec. 7, 1960, Ser. No. 74,247
4 Claims. (Cl. 214—5.5)

This invention relates to an apparatus for use in collecting and stringing tobacco leaves and more particularly to an apparatus suitable for use in the harvesting of a tobacco crop by a single operator.

In many sections of the country the rising cost of labor and equipment has greatly diminished the revenue obtained by tobacco growers and particularly the grower of a small acreage, who for economic reasons may prefer to do all of the harvesting work himself. As is known, the collecting of individual leaves from the growing stalks by the conventional priming method is time consuming and expensive when the labor of others must be hired, although it offers advantages in quality and quantity of tobacco harvested. Moreover, the housing of the primed tobacco, as in curing barns, also is time consuming and usually requires the hiring of such additional labor during the operations in which the collected leaves are strung together, transported to the barn, and raised to curing position. The field conditions under which tobacco is harvested also imposes limitations on the equipment employed in that dust, moisture, sap and gum from the leaves, and brushing of the equipment against the growing plants may cause malfunctioning of the equipment. Furthermore, for efficient work, during the collecting of the leaves, the operator should be so located with respect to the equipment that he may be comfortable and may work with a minimum of lost motion. In addition, the equipment should be relatively inexpensive and during operation should not damage the leaves which in a mature crop normally extend into the path of movement of such equipment. It is a purpose of this invention to overcome in large measure the disadvantages currently found when harvesting tobacco by the priming method, and to teach an improved coordinated method which may be conducted by a single operator if so desired.

An object of the invention is to provide an improved apparatus for use in collecting and stringing tobacco leaves alongside a row of growing tobacco.

Another object is to provide an improved apparatus suitable for use by a single operator in the priming of tobacco and enabling the operator to reduce lost motion during his work.

Another object is to provide an improved apparatus for stringing tobacco leaves and for arranging the strung leaves in the form of a handleable bundle.

Another object is to provide an improved carriage-mounted tobacco harvetsing apparatus adjustable for comfort of the operator.

A further object is to provide a tobacco stringing apparatus for field use and having moving parts from which extraneous materials are removed without requiring the attention of the operator.

A further object is to provide a strong, light-weight and inexpensive tobacco harvesting apparatus suitable for propulsion alongside a row of tobacco by an operator seated thereon.

Other objects and advantages of the invention will become apparent as the description proceeds and when considered in conjunction with the accompanying drawings, in which.

Figures 1, 15:
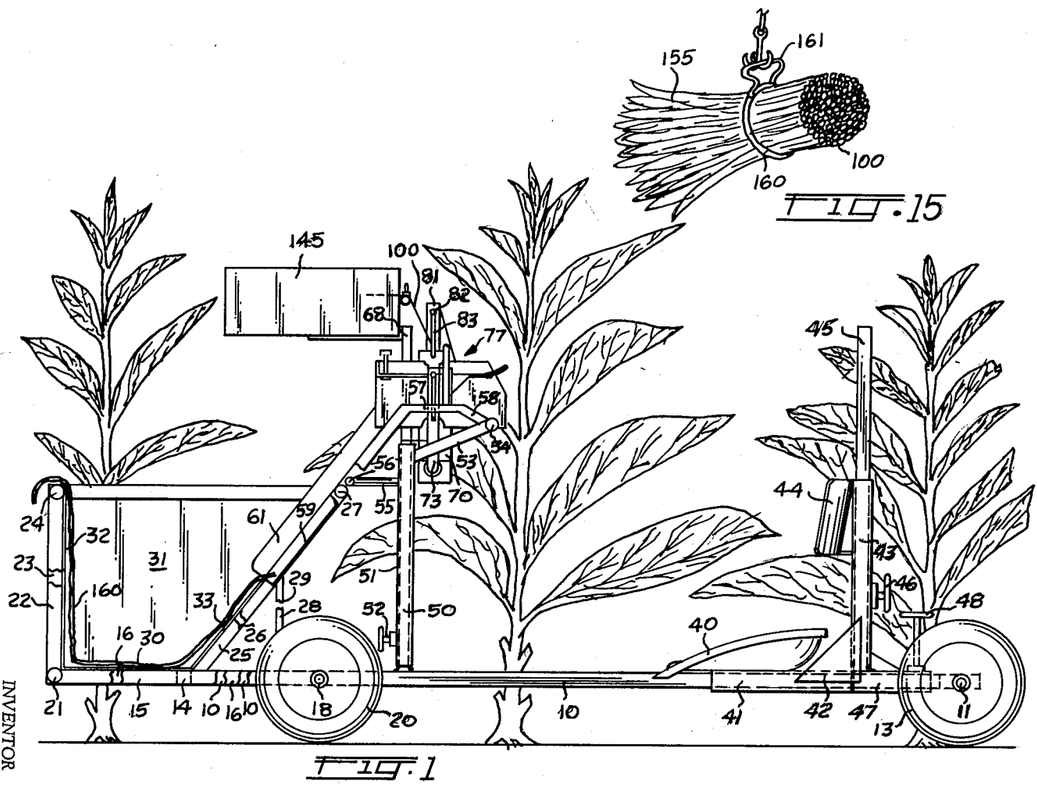
FIG. 1 is a side elevation view of one apparatus embodying the invention, with parts broken away, and with the apparatus shown in relation to the tobacco to be harvested.
FIG. 15 is a perspective view of a bundle of leaves ready for transport from the field to the barn.
Figures 2, 13:
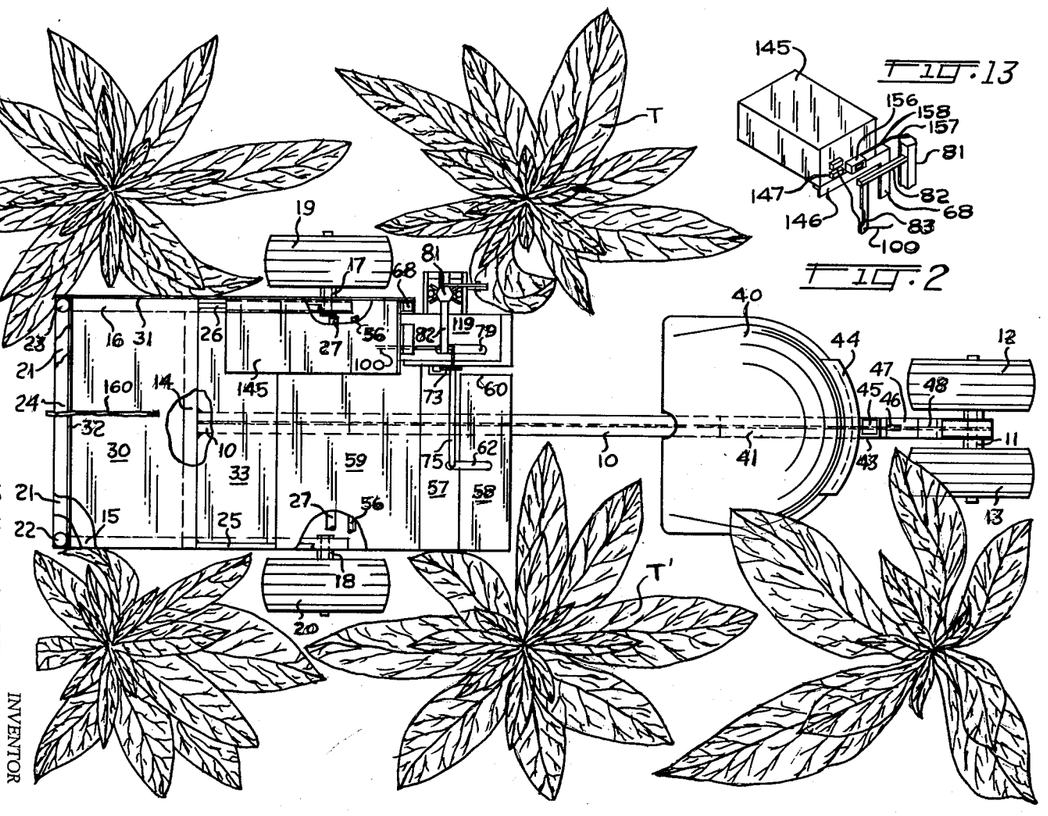
FIG. 2 is a plan view of the apparatus shown in FIG. 1.
FIG. 13 is a diagrammatic view showing one form of string supply and cycle-operation recording means.

Referring first to FIGS. 1 and 2, the apparatus embodying the invention is characterized by its light weight, its relatively small size which permits its being maneuvered in close proximity to a row of growing tobacco without damaging that tobacco, and its several features of construction arranged to permit use by a single operator under efficient working conditions. The apparatus includes a carriage having an elongated central beam 10 which is straddled by the operator and which, for example, may comprise an aluminum alloy in I-beam or tubular form. At one end this beam carries an axle 11 extending laterally on each side thereof and mounting a pair of freely rotatable wheels 12 and 13. At its other end the central beam is rigidly attached to the central portion of a cross beam 14, to the respective ends of which a pair of side beams 15 and 16 are rigidly attached adjacent their central portions.

At their ends nearer the operator's position these side beams mount the respective stub axles 17 and 18 on which the respective wheels 19 and 20 are mounted. All of the four wheels thus described preferably carry tires of a size which will give a low ground pressure and which have a diameter giving adequate ground clearance to the entire carriage. A free space for the operator's feet thus is provided between the stub axles for a purpose later to become apparent.

At their distant ends from the operator's position the side beams are joined transversely by a light weight cross beam 21 and upstanding from such ends of the side beams are light weight posts 22 and 23 joined at their top ends by a light weight cross brace 24. Upstanding from the side beams are a pair of inclined supports 25 and 26 extending generally toward the operator's position and having a cross brace 27 at their uppermost ends. A pair of upstanding short braces 28 and 29 are attached at their lower ends to the respective side beams 15 and 16 and at their upper ends to the respective inclined supports 25 and 26 and serve to give further rigidity to the skeleton structure thus described and which structure is located generally beyond of the axes of wheels 19 and 20.

This skeleton structure is suitably covered by a light weight sheet metal material which conveniently may comprise a floor portion 30 and a side wall portion 31 located on the side of the carriage corresponding to the side on which the string-attaching mechanism, later to be described, is located. In addition, a generally vertical wall portion 32 attached to the cross beam 21 and the cross brace 24 is provided, and a sloping chute portion 33 attached to the inclined supports 25 and 26 and to the cross brace 27 is also provided. As will now be apparent, the sheet metal material when thus secured in place forms a receptacle for receiving attached groups of leaves of tobacco sliding downwardly along the chute 33 and this receptacle is open at the top and at one side thus permitting ready off-loading of a bundle of tobacco leaves. Moreover, the location of the receptacle is such as to employ the weight of the accumulated groups of leaves in stabilizing the movement of the apparatus.

The carriage employed may be towed, or by appropriate mounting of a motor, may be self-propelled, all without departing from the broader aspects of the invention. However, it is preferred to have the carriage moved alongside the rows of the growing tobacco by the operator himself and for this purpose a suitable seat 40 is provided. In general, when collecting leaves from the stalks which are near the ground or at intermediate elevation on the stalks, the operator will remain seated and will propel the carriage by pushing with his feet on the ground and with the wheels 12 and 13 serving as forward wheels. When, however, the leaves at higher elevations are to be collected, it may be more comfortable for the operator to walk upright and to push the carriage with wheels 19 and 20 as the forward wheels. Since comfort of the operator at all times is important, the seat 40 is made adjustable and may be attached to a sleeve 41 embracing the sides of beam 10 when in its lowermost position. This sleeve by means of suitable bracing webs 42 is rigidly attached to a vertically movable tube 43 of non-circular form and with a suitable back rest 44 attached thereto. The tube is mounted for reciprocal movement on a corresponding non-circular post 45 and is adjustably positioned thereon by a heavy set screw or the like 46. The post in turn is rigidly mounted at its lower end on a sleeve 47 which embraces at all times the sides of beam 10 and which is adjustable longitudinally of that beam. An elevated set screw or the like 48 which will clear the tops of wheels 12 and 13 during its adjustments, is provided for the positioning of the entire seat assembly lengthwise of the carriage. Extending upwardly from and rigidly attached to the beam intermediate the seat and the wheels 19 and 20 is a strong pedestal 50 the purpose of which is now to be described.

Figure 3:
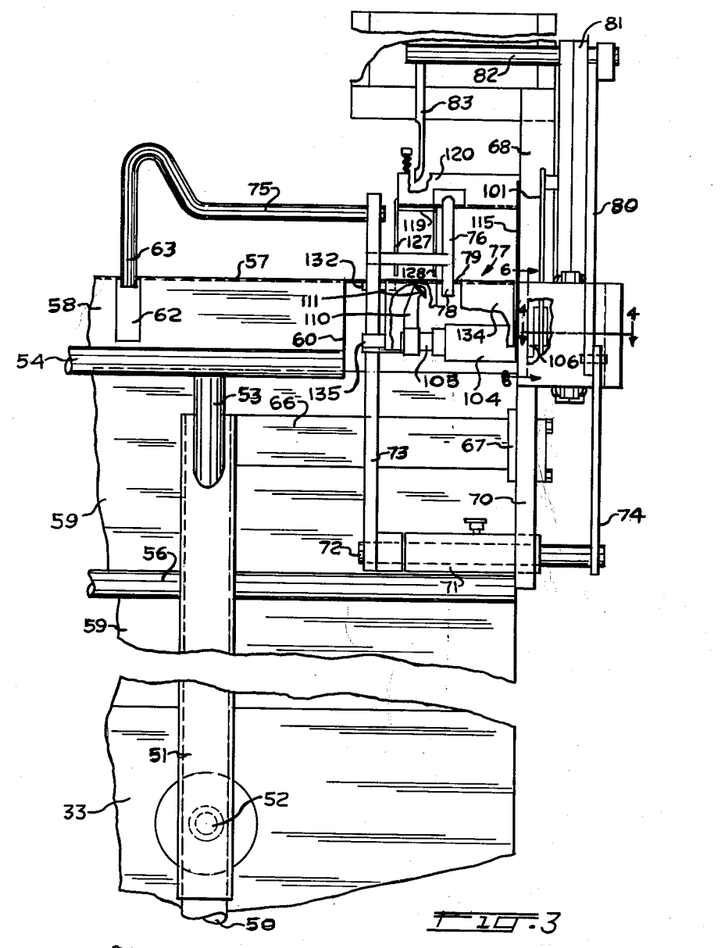
FIG. 3 is an end elevation view, to a larger scale, of the adjustable framework as viewed from the normal position of the operator of the apparatus, and with parts broken away.

As best seen in FIG. 3, the pedestal forms a support for an adjustable structure, herein termed a framework, and upon which certain manipulative operations are conducted in the harvesting of tobacco. This framework may include an elongated sleeve 51 movable axially of the pedestal and having a set screw or the like 52 for selective positioning of the framework at an appropriate elevation.

Projecting from the sleeve 51 near its upper end and extending toward the operator's position, is a strut 53 to the outer end of which is attached a first apron support rod 54 extending transversely of the carriage. On the opposite side of the sleeve at a lower elevation is a strut 55 to the outer end of which is attached a second apron support rod 56 also extending transversely of the carriage and the position of which with respect to the fixed cross brace 27 of the chute 33 is best seen in the cut away portion of FIGS. 1 and 2. Rigidly attached to the respective apron supports is a sheet metal apron having a generally horizontal uppermost flat shelf portion 57 merging on one side into a relatively narrow skirt 58 and on the other side into a relatively wide skirt 59 overlying the chute 33 of the receptacle. At one end the shelf and narrow skirt portions of the apron terminate along an inwardly offset edge 60 while the wide skirt portion terminates along that end in an upwardly directed flange 61 in substantially the same plane as the wall 31 of the receptacle. The other end of the apron, moreover, lies in substantially the same plane as the outer edge of the side beam 15. A slot 62 in each of the shelf and narrow skirt portions of the apron extends in the direction of the receptacle portion of the apparatus and in this slot a leaf-engaging member 63 is guided.

Figure 16:
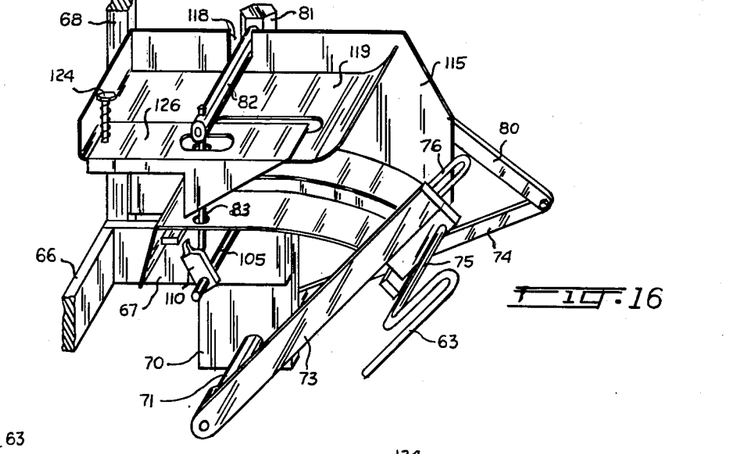
FIG. 16 is a perspective view of the string-attaching means and its leaf-indexing shield as viewed from the left side of the structure shown in FIG. 3 and with the needle in normal lowered position.
Figures 17, 18:
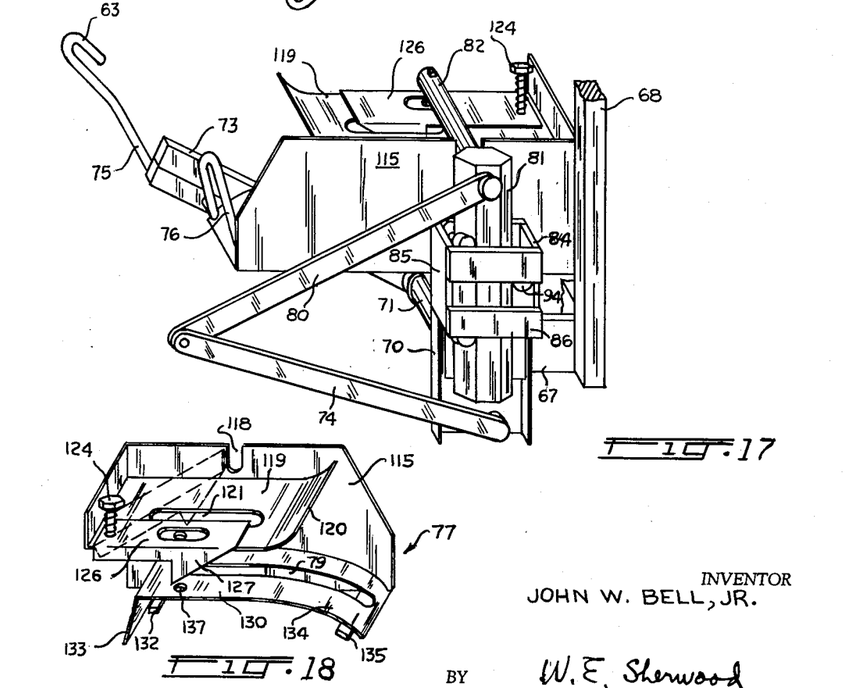
FIG. 17 is a perspective view of the structure of FIG. 16 as viewed from the far side of the right-hand row of tobacco being harvested.
FIG. 18 is a perspective view of the leaf-indexing shield shown in FIGS. 7, 8 and 9.

Again referring to the sleeve 51, adjacent its upper end and extending laterally thereof is a support arm 66, as shown in FIGS. 3, 16 and 17, to the outer end of which is rigidly attached a support plate 67 extending toward the operator's position. Mounted upon this support plate and extending upwardly therefrom, is a string supply post 68. Also mounted upon this support plate is a bearing plate 70 of C-shaped channel form and which has a lower portion disposed beneath the support plate and an upper portion disposed above that support plate. Affixed to the lower portion of plate 70 and projecting inboard of the framework is a bushing 71 in which is journalled for oscillatory movement a shaft 72. Rigidly attached to the inner end of this shaft is a leaf-pushing lever 73 and to the outer end thereof a crank arm 74. Adjacent its upper end the lever 73 has affixed thereto a bar 75 adapted to be pushed by the hand of the operator, and connected to the member 63. Also affixed to the lever is a second leaf-pushing member having an upper portion 76 movable within the throat portion of a leaf-indexing shield 77 later to be described, and a lower portion 78 movable in a slot 79 within that shield.

Figure 4:
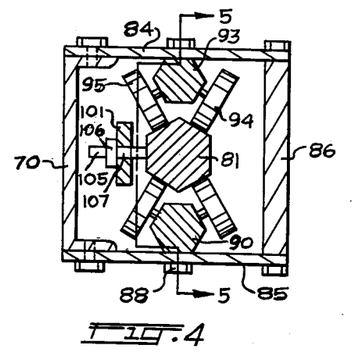
FIG. 4 is a sectional view of the slide and its mounting taken on line 4—4 of FIG. 3.
Figure 5:
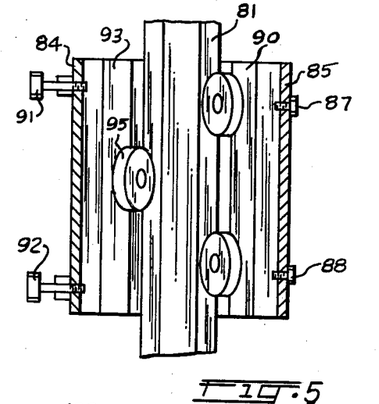
FIG. 5 is a view showing the mounting of the slide as taken on line 5—5 of FIG. 4 and with parts shown in elevation for clarity.

Pivotally attached to the upper end of crank arm 74 is a link 80 which in turn is pivotally attached at its upper end to a needle-actuating slide 81. A laterally extending arm 82 attached to the upper end of this slide is adapted to carry a downwardly projecting needle 83. As best seen in FIG. 4, the slide 81 may conveniently comprise an elongated hexagonal bar cradled for vertical movement between pairs of guide rollers and mounted in such a way as to eliminate mal-functioning due to extraneous material being trapped in the moving parts. As is known, the operation of tobacco harvesting apparatus under field conditions involves the deposition of dust, water, gum, sap, and the like upon the equipment and as a feature of the invention, the moving slide 81 is mounted in a box-like housing open at each end. In this way, any gum and dust deposited on the slide may be removed therefrom by the abrading action of the rollers and may fall through the housing. A simple housing arrangement, for example, may comprise a pair of side plates 84 and 85 attached to the edges of the bearing plate 70 at an elevation suitable for confining the slide at its uppermost position of travel and in turn affixed to a spacer plate 86 for completing the open-end box structure. Rigidly attached to plate 85 as by fastenings 87 and 88 is a short hexagonal bar 90 having an upper pair of rollers and a lower pair of rollers rotatably mounted thereon in rolling contact with two adjacent respective sides of the slide 81. Adjustably attached to plate 84 as by set screws or the like 91 and 92 is a short hexagonal bar 93 having a centrally located pair of rollers 94 and 95 mounted thereon in rolling contact with another two adjacent respective sides of the slide, these latter sides being diametrically opposite the sides on which the two pairs of rollers engage. As a result, the movement of the slide is cradled within the groups of rollers and by suitable adjustment of the set screws, a smooth movement of the slide occurs when actuated by the operator in the manner later to be described.

As a feature of the invention, the pivot point of crank arm 74 and link 80 at all times is nearer the operator's position than is the shaft 72. The weight of the slide 81 and its attached parts moreover, is such that it normally rests in its lowered position, thus establishing a normal lowered position for needle 83, a normal retracted position for lever 73 and leaf-pushing members 63 and 76, and a normal open shelf space for receiving the tobacco leaves to be placed thereon by the operator. The operator accordingly is saved the effort of retracting these elements and may be reaching for additional leaves as the apparatus resets itself for the next cycle of stringing.

Figure 6:
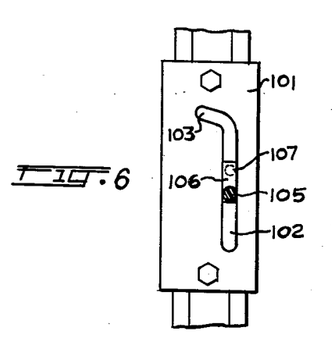
FIG. 6 is a view taken on line 6—6 of FIG. 3 and showing the cam plate carried by the slide.
Figure 7:
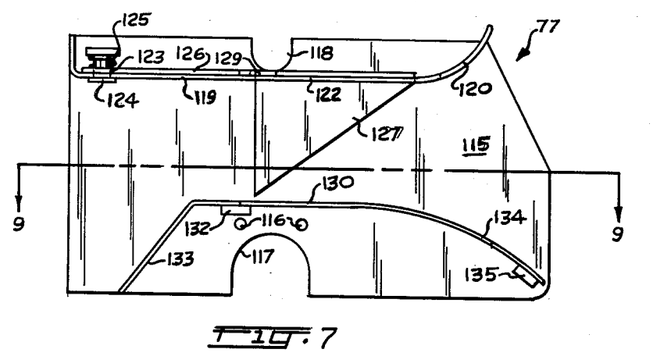
FIG. 7 is an elevation view of the leaf-indexing shield along the axis of the shelf.
Figure 8:
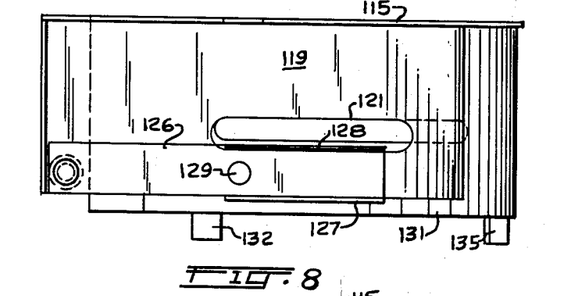
FIG. 8 is a plan view of the shield of FIG. 7.
Figure 9:
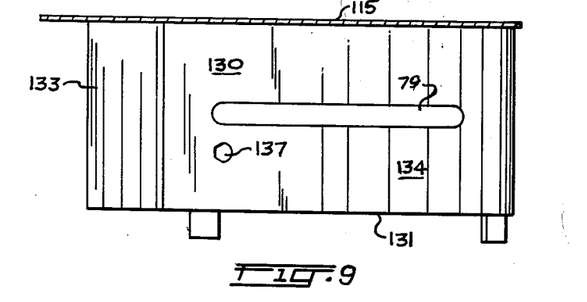
FIG. 9 is a sectional view of the shield taken along line 9—9 of FIG. 7.

Referring now to FIGS. 3 and 6 the slide has attached thereto on its face confronting the plate 70, an elongated cam plate 101 with a slot 102 therein containing an offset upper recess 103. Rigidly attached to plate 70 and extending inboard of the framework is a bushing 104 within which is mounted for oscillatory movement a shaft 105. At its outer end the shaft has rigidly attached thereto an arm 106 from which a roller 107 projects into the slot 102 of the cam plate. At its inner end the shaft 105 has attached thereto a conventional looping arm 110 (FIG. 12) terminating in a curved tip 111 adapted to engage with a string 100 when the shaft is moved in one direction and to disengage from that string when the shaft is moved in the other direction.

Considering now FIGS. 7, 8, 9 and 18, a suitable shield 77 for assisting in the indexing of the leaves being harvested is shown as comprising a side plate 115 which by means of suitable fastenings passing through holes 116 may be rigidly affixed to the bearing plate 70 above the bushing 104. For compactness, the lower edge of the side plate may have an arcuate recess 117 embracing a portion of that bushing and the upper edge may have a recess 118 into which the arm 82 may move when the needle 83 is fully lowered. As will later appear, the plate 115 serves as a backstop against which the ends of the stems of the leaves may be indexed by the operator prior to actuating the leaf-moving and string-attaching mechanism. Further to assist the manual dexterity of the operator, a laterally projecting upper guide plate 119 is attached to the side plate and includes a sloping surface 120 confronting the operator's position and guiding leaves into the throat portion of the shield. This upper plate contains an elongated slot 121 within which the upper portion 76 of the second leaf-pushing member (FIG. 3) is adapted to move; an aperture 122 for receiving the needle 83, and an aperture 123 for receiving a fastening 124 having a spring loading 125.

Pivotally mounted above the upper plate is a leaf latch 126, urged to lowered position by the spring loading and having a pair of inclined cam plates 127 and 128 at its sides. These cam plates include an abrupt rear wall disposed slightly beyond the axis of movement of needle 83 in the direction of travel of the leaves and also include a lower apex point normally occupying a position close to the supplementary shelf portion now to be described. In addition, the cam plate 127 moves in a plane outboard of the edge of the plate 119 and the cam plate 128 moves in a plane intersecting the slot 121, but without interference with the movement of the second leaf-pushing member in that slot. Thus the movement of the latch is confined to a vertical direction. An aperture 129 in the latch also is provided to receive the needle 83.

Laterally extending from the side plate 115 is a lower guide plate having a central flat generally horizontal shelf portion 130 forming a prolongation of the main shelf portion 57 of the apron and terminating at an edge 131 parallel to and spaced from the edge 60 of that main shelf portion. Within the space between these edges the lever 73 is adapted to travel and on the lower side of shelf portion 130 and extending into that space a forward abutment 132 is located for limiting the forward pushing movement of the leaf-moving mechanism. Extending downwardly from the distant edge of the shelf portion 130 is an inclined skirt 133 lying in prolongation of skirt 59 and cooperating therewith is guiding the strung groups of leaves toward the receptacle on the carriage. Extending downwardly from the near edge of the shelf portion 130 is an inclined skirt 134 lying in prolongation of skirt 58 and cooperating therewith in guiding the newly collected leaves into position on the shelf for being strung. Projecting from skirt 134 is a rearward abutment 135 for limiting the retracting movement of lever 73. In addition, an elongated slot 79 is provided in the lower guide plate for receiving the second leaf-pushing member, and an aperture 137 is provided for receiving the needle 83.

Figure 10:
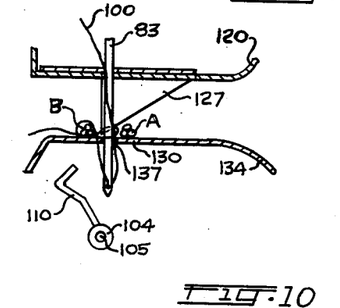
FIG. 10 is a diagrammatic view showing the location of the needle and looping member when the leaf-moving mechanism is fully retracted.
Figures 11, 12:
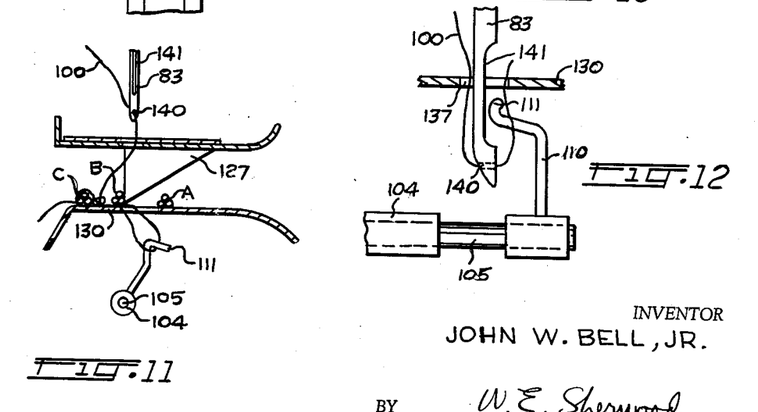
FIG. 11 is a view similar to FIG. 10 and showing the parts when the leaf-moving mechanism is pushed fully forward.
FIG. 12 is a side elevation view of the needle and looping member as the needle starts its upward movement.

Referring now to FIGS. 10, 11, and 12, the needle 83 includes an eye 140 near its curved lower end and a scarfed portion 141 movable in a plane coinciding with the plane of the path of movement of the tip 111 of the looping arm 110. The continuous string 100 passing downward into and through the eye of the needle is continued upward through the aperture 137 of the shelf 130, as best seen in FIG. 10 and with the needle occupying its normal lowered position at the start of operation. When, however, the operator moves the stem ends of a group of leaves at position A forward beyond latch 127 simultaneously causing the needle 83 to rise and the looping arm to turn as seen in FIG. 11, the leaves press laterally against the string coming from the eye of the needle and the looping arm holds an open loop of the string beneath the shelf 130. As the needle again lowers, it bring the string completely around the group of leaves formerly at position A (and now at position B), and also brings the string into the opened loop which had been held beneath shelf 130. Meanwhile, the looping arm had returned with reverse movement to its position of FIG. 10 leaving the opened loop for reception of that needle. The looped group of leaves at position B then moves to position C on the next cycle of operation as will be further described in connection with the overall operation of the apparatus.

As shown in FIG. 13, a large supply of string may conveniently be housed in a container 145 mounted on an arm 146 projecting laterally from the top of the string supply post 68 carried on the framework. Upon passing from the container, the string 100 preferably moves through a snubbing means 147 mounted on the exterior of that container and thence to the eye of needle 83.

Figure 14:
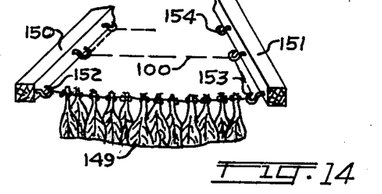
FIG. 14 is a diagrammatic view of a bundle of strung leaves hung in a curing barn.

As described in my U.S. Patent 2,896,797 and as further exemplified by FIGS. 14 and 15 hereof, the tobacco harvesting operation preferably includes the hanging of the sequentially strung groups of leaves 149 between rails 150 and 151 by attachment of one end of string 100 to a hook 152 on one rail, stretching of the string across to a hook 153 on the other rail, and thence in zig-zag fashion until the other end of the string is attached to the final hook 154. It, therefore, is important that the length of a section of string reaching the barn be commensurate with the distance to be traversed between rails and also be commensurate with the ability of the operator to handle the weight and bulk of tobacco held by that section of string. In employing the present invention with a one-man operation wherein the tobacco is to be cured upon rails in a barn, it has been found that a handleable bundle 155 as shown in FIG. 15 comprising about forty pounds of weight, and about 100 groups of leaves with about three leaves in each group, will serve this objective and will permit three traverses between the rails as seen in FIG. 14. In order, therefore, to indicate to the operator of the described apparatus when the required number of such groups of leaves have been looped, a conventional recording device 156 may be mounted on the string container 145 facing toward the operator's position. A suitable connection 157 extending between the arm 158 of that recorder and a movable portion of the apparatus, for example, the top of the slide 81, may be used to actuate the recorder.

Having thus described one suitable form of apparatus for carrying out the invention, the several advantages and objectives of the same will now become apparent to those skilled in the art by reference to the following description of a typical one-man operation of the same. Assuming that the tobacco has matured to the point at which the lowermost leaves are ready for priming, the operator first arranges a rope 160 in the receptacle portion of the carriage as seen in FIG. 1. With the string 100 attached to needle 83 and with a free end portion of that string sufficient for tying to a hook on a rail, payed out on the apron, and with the seat 40 and the framework sleeve 51 in their lowermost positions, the operator then seats himself and with his feet pushes the carriage to the right as seen in FIG. 1. As he approaches the respective plants T and T' in FIG. 2 for example, he picks the leaves and with one hand places them on the shelf 57 and shelf extension 130 in the position as seen at A in FIG. 10. At this time the respective butt ends of the stems are approximately in the same plane and adjacent the side plate 115 of the leaf-indexing shield. With the other hand the operator then pushes forward on the leaf-moving bar 75 and as this is done the following significant operations occur simultaneously.

The lever 73 and its attached leaf-engaging members 63 and 76 push the group of leaves at three spaced regions transversely across that shelf and with the butt portions of the stems pushing against the spring-biased latch sides 127 and 128 and lifting the same. After passing beyond those latch sides the leaves are confined in advance of the travel of needle 83 and also in so moving forward the stems have pushed ahead of them a portion of string 100 and the immediately preceding group of leaves which has already been strung. Moreover, in moving the bar 75 to its advanced position the operation of the string-attaching means has taken place in dependence upon the movement of that bar through the intermediary of the crank arm 74 and link 80. Promptly after the needle 83 has raised and the looping arm 110 has moved to its extreme looping position the operator releases his grip on bar 75 and the slide moves downward under action of its weight, the lever 73 and its attached leaf engaging members simultaneously moving to retracted position and clearing the shelf for the next group of leaves.

As this occurs, the needle 83 moves downwardly and completes the looping of the above described group of leaves; it being understood that the tightness of the loop around the stems is so chosen as to give a firm grip on the leaves for subsequent handling and curing operations, but not so tight as to cut through the relatively tender cells of the freshly removed tobacco stems. The just described cycle of operation is registered by the recording device 156 and by then propelling the carriage a slight distance to the next station, if necessary, the operator collects additional leaves and carries out the next subsequent cycle. Usually, a plurality of looping operations may be conducted at each station occupied by the carriage since more than one stalk is in easy reach of the operator at any given position of the carriage.

At the beginning of the production of a bundle of strung leaves the first few groups of leaves pushed from the shelf and guided toward the receptacle by the skirts 59 and 133 may tend to hang downwardly in a non-horizontal array, but usually this condition is self-correcting as these initial groups are pushed along by subsequent groups and as the first group of leaves reaches the bottom 30 of the receptacle. If for any reason the group of leaves do not distribute themselves in uniform, horizontal array in the receptacle, it is a simple matter for the operator to readjust them so that their approximate mid-points lie above the rope 160. After once establishing a layer of groups side-by-side and extending horizontally across the chute 33, and apron 59, the subsequent groups are pushed toward the receptacle in a uniform manner during each cycle of operation.

Thus, when the proper number of groups has been processed, the operator manually pulls the string 100 through the eye of needle 83 to provide a suitable length to attach to one of the hooks of the barn rail, cuts the string, and then encloses the previously strung groups, now in the receptacle, with rope 160. Upon tying the ends of this rope, a bundle 155 as seen in FIG. 15 is produced and with all of the stem ends of the leaves in uniform array at one end of that bundle. This bundel may be off-loaded from the carriage and priming operations then resumed until a selected time, or until a sufficient number of bundles have been deposited on the ground to warrant their collection and transport to the barn. As a further feature of the invention, each bundle is provided with a handle 161 detachably affixed to rope 160 and having suitable means for holding that handle in upright position. The handle has an opening of generous size into which a grapple means may be engaged from a distant control point.

When, therefore, the bundles are transported to the barn, and which may be accomplished by the same operator who previously operated the leaf-collecting and leaf-stringing apparatus, they may be placed on the barn floor beneath rails 150 and 151 with a suitable spacing and with the handles of each bundle extending upwardly. The same operator may then climb to the rails and standing upon a movable board, lower a rope with a grapple hook thereon to engage in the handle of a selected bundle. After manually raising the bundle, the operator then unties the rope 160, attaches one end of its string to hook 152 and proceeds to distribute the bundle for curing as indicated by FIG. 14. Subsequent bundles are handled in the same manner.

Since the entire crop is not normally harvested at one time when using priming procedure, it will be understood that a plurality of passages through the field using the above described apparatus will be necessary. Usually these passages are separated by several days or weeks in order to permit the leaves to grow to maturity. On the second passage through the field, both the seat 40 and the sleeve 51 of the framework may be elevated above the position seen in FIG. 1, and leaves at a higher elevation can be harvested with the same comfort as when the first leaves were harvested. When, however, it becomes more comfortable for the operator to stand in harvesting, then the seat 40 may be removed from post 45 and the operator may push the carriage by hand while standing on the ground during that harvesting and in which arrangement the carriage would then be pushed to the left, as viewed in FIG. 1. As the framework is adjusted upwardly it will be understood that the apron 59 lifts above the fixed chute 33 of the receptacle but that the movement of the groups of leaves coming from the shelf is guided as before upon the rope 160.

In all adjustments of the framework, the shelf 57 and shelf extension 130 remain substantially horizontal and extend substantially normal to the axis of the rows of tobacco. As a result, the operation of the leaf-moving elements of the apparatus cause a group of leaves upon its movement beyond the latch to push ahead each of the preceding groups of leaves by mutual contact therebetween. Since the shelf is located above the receptacle into which these preceding groups are being forced, no excessive effort is placed upon the operator and no excessive bruising of the leaves by the contact of lever 73 and members 63 and 76 therewith, can result.

While in accordance with the patent statutes I have shown what at present is considered to be the preferred embodiment of my invention, it will be obvious to those skilled in the art that various changes and modifications may be made therein without departing from my invention, and I, therefore, aim, in the appended claims, to cover all such changes and modifications as fall within the true spirit and scope of the invention.

What I claim as new and desire to secure by Letters Patent of the United States is:

1. In a tobacco harvesting apparatus for use under field conditions and including a carriage for movement alongside a row of growing tobacco and brushing thereagainst, a string-looping means for joining groups of tobacco leaves by a continuous string looped around the stems of said leaves and comprising a generally vertical reciprocable slide, a framework mounted upon said carriage, means for mounting said slide upon said framework and including a housing open at each of its vertical ends, means for actuating said slide, and roller means mounted within said housing and supporting said slide whereby extraneous material deposited upon said slide may be removed therefrom by said rollers and fall through the open lower end of said housing as said slide is moved by said slide-actuating means.

2. Apparatus as defined in claim 1 wherein said slide has a non-circular cross section, and said roller means comprise a pair of rollers engaging the exposed surfaces of said slide along one side thereof and a second pair of rollers engaging the exposed surface of said slide along a diametrically oppose side of said slide.

3. Apparatus as defined in claim 1 wherein said slide supports for reciprocable movement a string-carrying needle of said string-attaching means.

4. Apparatus as defined in claim 1 wherein said slide supports for reciprocable movement a cam plate for actuating an oscillatory looping member for said string-attaching means.

References Cited in the file of this patent
UNITED STATES PATENTS

| | | |
|---|---|---|
| 710,027 | Wheeler | Sept. 30, 1902 |
| 1,483,558 | Sponsel | Feb. 12, 1924 |
| 2,131,656 | Dinkins | Sept. 27, 1938 |
| 2,327,252 | Dickerson | Aug. 17, 1943 |
| 2,792,949 | Deskur | May 21, 1957 |
| 2,896,797 | Bell | July 28, 1959 |
| 2,954,132 | Davis | Sept. 27, 1960 |